(12) United States Patent
Ishibashi et al.

(10) Patent No.: US 7,589,767 B2
(45) Date of Patent: Sep. 15, 2009

(54) IMAGE-RECORDING DEVICE

(75) Inventors: Koichi Ishibashi, Tokyo (JP); Naoki Yamagata, Saitama (JP)

(73) Assignee: Hoya Corporation, Tokyo (JP)

( * ) Notice: Subject to any disclaimer, the term of this patent is extended or adjusted under 35 U.S.C. 154(b) by 542 days.

(21) Appl. No.: 11/422,102

(22) Filed: Jun. 5, 2006

(65) Prior Publication Data

US 2006/0279645 A1 Dec. 14, 2006

(30) Foreign Application Priority Data

Jun. 7, 2005 (JP) .......................... P2005-166532

(51) Int. Cl.
*H04N 5/76* (2006.01)
(52) U.S. Cl. .............. 348/231.8; 348/231.2; 348/231.3; 348/231.5; 348/231.7
(58) Field of Classification Search .... 348/231.1–231.8
See application file for complete search history.

(56) References Cited

U.S. PATENT DOCUMENTS 6,914,625 B1 * 7/2005 Anderson et al. ........ 348/222.1

2003/0156207 A1 * 8/2003 Kalinski ................... 348/231.1

FOREIGN PATENT DOCUMENTS

JP 2004-201226 7/2004

OTHER PUBLICATIONS

English Language Abstract of JP 2004-201226, Sep. 5, 2006.
U.S. Appl. No. 11/420,871 to Ishibashi et al., filed May 30, 2006.

* cited by examiner

*Primary Examiner*—Tuan V Ho
*Assistant Examiner*—Selam T Gebriel
(74) *Attorney, Agent, or Firm*—Greenblum & Bernstein P.L.C.

(57) ABSTRACT

An image-recording device comprises a recording processor that records a common still image on a plurality of recording media, respectively, which are detachably mounted on the image-recording device. A common unique data is recorded together with the still image on the plurality of recording media in a photographing operation, respectively. In a displaying operation for the still image, the unique data is read out from the plurality of recording media. When the read-out unique data coincide with one another, the image-recording device displays record information indicating that the read-out unique data are identical.

20 Claims, 5 Drawing Sheets

FIG. 3

| FOLDER-NAME<br>FILE-NAME | | 100<br>0001 | 100<br>0002 |
|---|---|---|---|
| SD | RAW | SCENE A | SCENE C |
|  | JPEG | SCENE A | SCENE C |
| CF | RAW | SCENE B | SCENE C |
|  | JPEG | SCENE B | SCENE C |

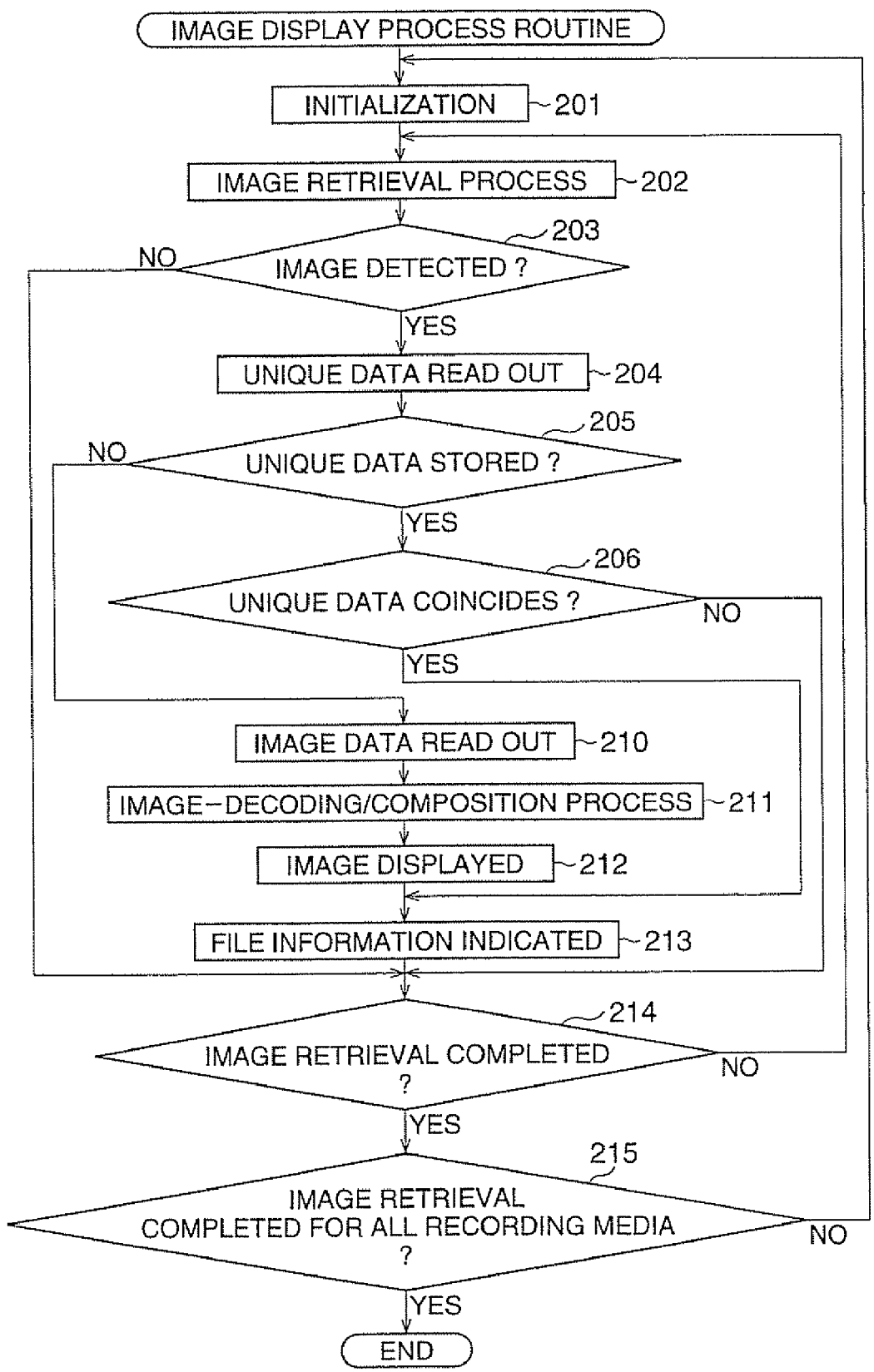

IMAGE-RECORDING DEVICE

BACKGROUND OF THE INVENTION

1. Field of the Invention

The present invention relates to an image-recording device, which can simultaneously record a common still image on a plurality of recording media, for example.

2. Description of the Related Art

Conventionally, a digital camera has been proposed, on which two recording media, such as a CF card and an SD card, can be detachably mounted. The two recording media are used mainly for backup, so that one still image, obtained by a photographing operation, is simultaneously recorded on each of the recording media. These recording media can be separately used. For example, it is possible for only one recording medium to be mounted on a personal computer to perform an image process on an image. Further, the same recording media are not always used simultaneously. For example, two recording media, which have been separately used, may be mounted on a single digital camera.

In a conventional digital camera, when two recording media are mounted, an operation such as deletion can be carried out for images having a common folder-name/file-name pair. Namely, in two images, if their folder-name/file-name pairs are identical, it is deemed that the two images were recorded at the same time. In reality, however, even if the folder-name/file-name pairs are identical, the two images may be different, and this issue cannot be confirmed before the operation. Because of this, an image, which is not intended to be deleted, may be deleted by mistake.

SUMMARY OF THE INVENTION

Therefore, an object of the present invention is to provide an image-recording device, in which the contents of images, recorded on a plurality of recording media, for example, can be confirmed before performing an image process on the images, so that the execution of an erroneous image process is prevented.

According to the present invention, there is provided a first image-recording device comprising a recording processor, a unique data recording processor, and a record information displaying processor.

The recording processor records a common still image on a plurality of recording media, respectively, which are detachably mounted on the image-recording device. The unique data recording processor records a common unique data with the still image on the plurality of recording media in a photographing operation, respectively. The record information displaying processor, in a displaying operation for the still image, reads out the unique data from the plurality of recording media, and when the read-out unique data coincide with one another, controls the image-recording device to display record information indicating that the read-out unique data are identical.

Further, according to the present invention, there is provided a second image-recording device comprising a recording processor, a unique data recording processor, and a record information displaying processor.

The recording processor records a common still image on a recording medium, which is detachably mounted on the image-recording device, and an internal memory, respectively. The unique data recording processor records a common unique data with the still image on the recording medium and the internal memory in a photographing operation, respectively. The record information displaying processor, in a displaying operation for the still image, reads out the unique data from the recording medium and the internal memory, and when the read-out unique data coincide with one another, controls the image-recording device to display record information indicating that the read-out unique data are identical.

Furthermore, according to the present invention, there is provided a third image-recording device comprising a recording processor, a unique data recording processor, and a record information displaying processor.

The recording processor records a common still image in a plurality of recording areas of an internal memory. The unique data recording processor records a common unique data with the still image in the plurality of recording areas in a photographing operation. The record information displaying processor, in a displaying operation for the still image, reads out the unique data from the plurality of recording areas, and when the read-out unique data coincide with one another, controls the image-recording device to display record information indicating that the read-out unique data are identical.

BRIEF DESCRIPTION OF THE DRAWINGS

The objects and advantages of the present invention will be better understood from the following description, with reference to the accompanying drawings in which:

FIG. 3 is a view showing a state, in which different image data or identical image data are recorded in the same folder-name/file-name pair on an SD card and on a CF card;

FIG. 6 is a flowchart for an image display process routine.

DESCRIPTION OF THE PREFERRED EMBODIMENTS

Figure 1:
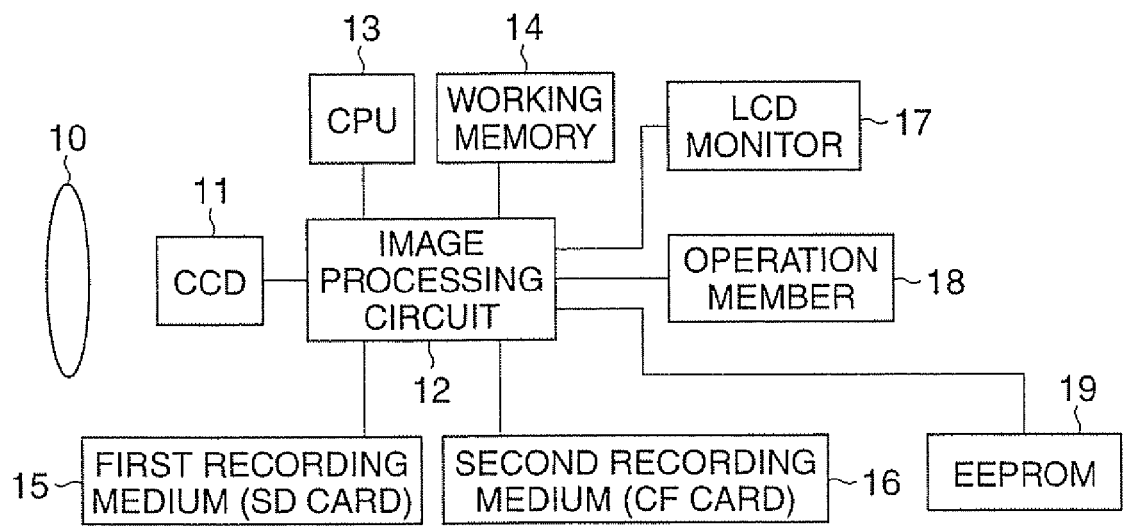
FIG. 1 is a block diagram showing a general construction of a digital camera, to which an image-recording device of an embodiment of the present invention is applied.

The present invention will be described below with reference to the embodiments shown in the drawings.

FIG. 1 is a block diagram showing a general construction of a digital camera, to which an image-recording device of an embodiment of the present invention is applied.

An imaging device 11, provided on the optical axis of the photographing optical system 10, can be a CCD, for example. In the imaging device 11, an analog image signal is generated, in accordance with a subject image formed on a light-receiving surface thereof. The analog image signal is A/D-converted to digital image data by an A/D-converter (not shown), and is input to an image processing circuit 12.

The image processing circuit 12 is controlled by a CPU 13. Namely, the image data is temporarily stored in a working memory 14, and is then read out so that the image data is subjected to image processing such as a compression process (JPEG, for example). The raw data, which is not subjected to image processing, and the compressed image data, which is subjected to image processing, can be recorded on a first recording medium (SD card) 15 and a second recording medium (CF card) 16. The raw data and the compressed image data, which are still images, are read from the first and second recording media 15 and 16, so that the still images are displayed on the screen of an LCD monitor 17.

Further, the image data input to the image processing circuit 12 are temporarily stored in the working memory 14, and are then input to the LCD monitor 17, so that the subject is shown as a moving image on the screen of the monitor 17.

For carrying out operations such as a recording operation on the recording media 15 and 16, and an indication operation on the monitor 17, an operation member 18, provided with various kinds of switches, is connected to the image-processing circuit 12. Further, an EEPROM 19 is connected to the image-processing circuit 12, and a unique data, which will be described later, and so on are stored in the EEPROM 19.

Figure 2:
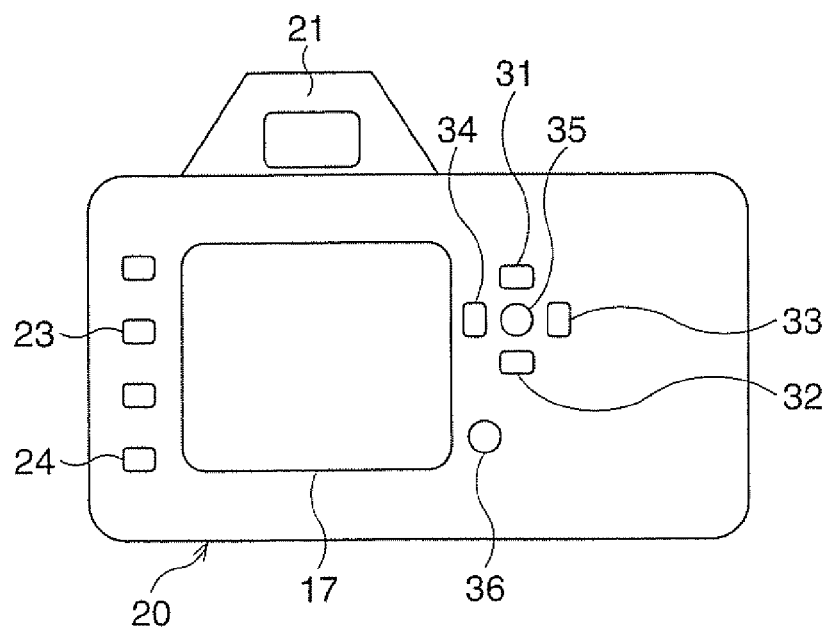
FIG. 2 is a view showing the layout of the rear surface of the digital camera.

FIG. 2 shows the rear surface of the digital camera. A viewfinder 21 is provided on upper surface of the camera body 20. On the rear surface of the camera body 20, the LCD monitor 17 is disposed below the viewfinder 21 in order to display an image or a menu. A deletion button 23 and a reproduction button 24 are arranged to the left side of the LCD monitor 17. By pressing the deletion button 23, image data recorded on the recording media 15 or 16 are deleted. By pressing the reproduction button 24, a still image is reproduced on the screen of the LCD monitor 17, based on image data recorded on the recording media 15 or 16.

An up button 31, a down button 32, a right button 33, a left button 34, a selection button 35, and an execution button 36 are provided on the right side of the LCD monitor 17. For example, when a menu is indicated on the screen of the LCD monitor 17, by pressing the up button 31, the down button 32, the right button 33, or the left button 34, the position of a cursor indicated on the menu can be changed. By pressing the selection button 35, the operation mode indicated by the cursor can be selected, and by pressing the execution button 36, the selected operation mode can be executed.

Figure 4:
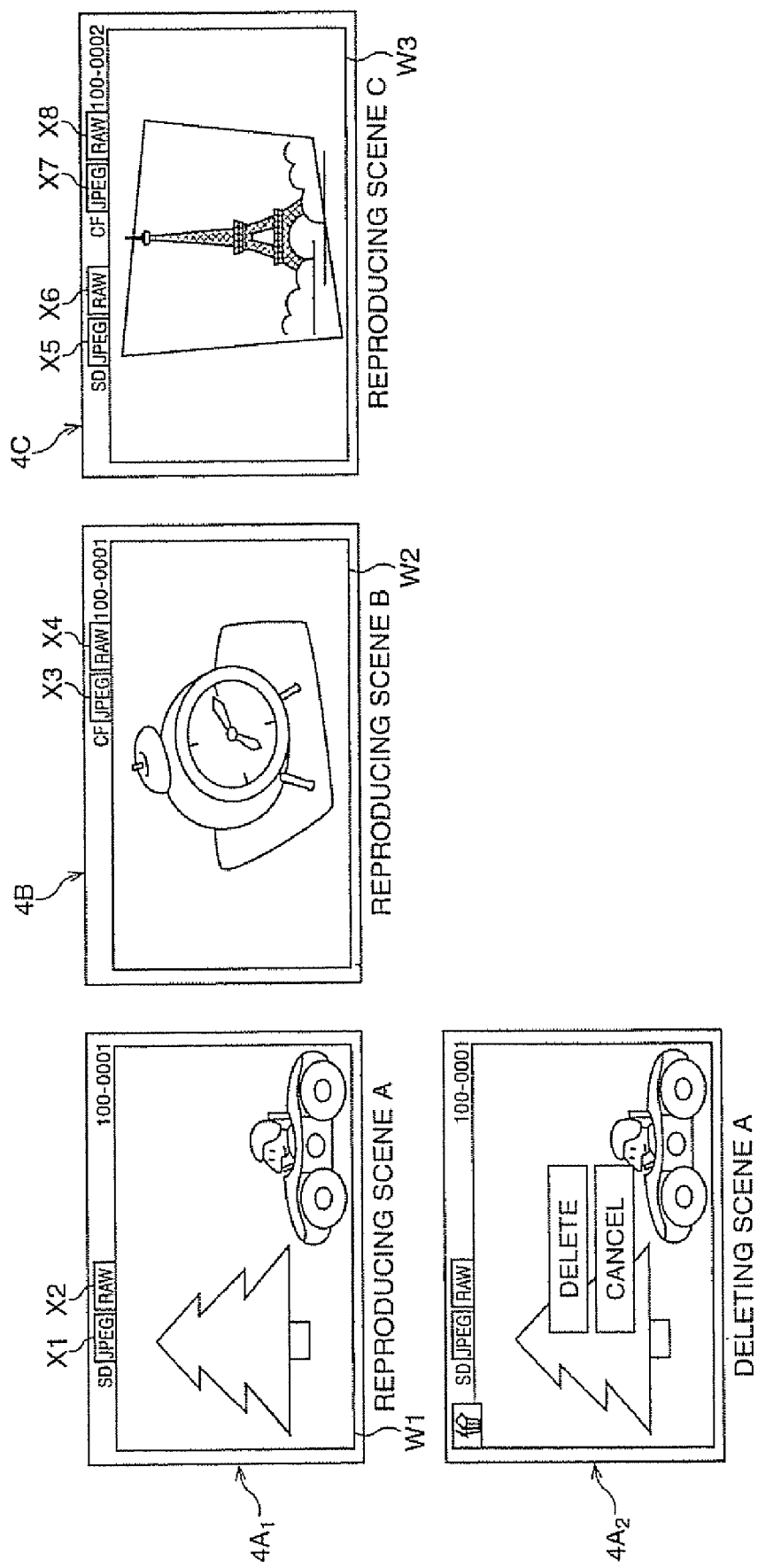
FIG. 4 is a view showing image planes corresponding with FIG. 3.

With reference to FIGS. 3 and 4, a relationship among image data, which are recorded on the first recording medium (SD card) 15 and on the second recording medium (CF card) 16, and still images, which are displayed on the screen of the LCD monitor 17, are described as follows. The recording media 15 and 16 are detachably mounted on the camera body 20, and a common still image is recorded in a recording area, which is specified by a folder-name/file-name pair, in a single photographing operation. Thus, the folder-name/file-name pair is attached to each of the images as a serial number. The folder-name/file-name pair is formed in a hierarchical structure, in which a large number of file-names exist in a stratum below a single folder-name. Namely, a "frame name" corresponding to one image is defined by a folder-name/file-name pair, and a common still image, to which an identical frame name is attached, is recorded on the two recording media 15 and 16, respectively, in a single photographing operation.

Further, in every photographing operation, a unique data that is common to the recorded image data is recorded together with the image data, in a similar way as the frame name. The unique data is identify information, which is attached commonly to the image data recorded in a single photographing operation, and which is a lifelong shutter number from the manufacturing date (or a total count of shutter operations, starting from the manufacturing date). The unique data may be a day and time containing an hour, a minute, and a second. The unique data is maintained and updated by the CPU 13, and is stored in the EEPROM 19.

Compressed data (JPEG) and raw data (RAW) can be recorded in each of the recording areas of the recording media 15 and 16. FIGS. 3 and 4 show cases in which the compressed data and the raw data are recorded on the recording media 15 and 16. Namely, on the recording media 15 and 16, the compressed data and the raw data are recorded in recording areas, in both of which the folder-name/file-name pair is "100-0001". An image (scene A) recorded on the first recording medium (SD card) 15 and an image (scene B) recorded on the second recording medium (CF card) 16 are different. This is a case in which the recording media 15 and 16 are not simultaneously used, but are used separately so that different image data are recorded. Further, on the recording media 15 and 16, the compressed data and the raw data are recorded in recording areas, in both of which the folder-name/file-name pair is "100-0002", and the same images (scene C) are recorded in all the recording areas.

In FIG. 4, reference $4A_1$ shows an image plane indicated on the screen of the LCD monitor 17, in which an image (scene A) of the folder-name/file-name pair "100-0001" of the recording medium (SD card) 15 is reproduced, and reference $4A_2$ shows an image plane indicated on the screen of the LCD monitor 17, in which the deletion mode is selected while the image (scene A) is reproduced. Reference 4B shows an image plane indicated on the screen of the LCD monitor 17, in which an image (scene B) of the folder-name/file-name pair "100-0001" of the recording medium (CF card) 16 is reproduced. Reference 4C shows an image plane indicated on the screen of the monitor 17, in which an image (scene C) of the folder-name/file-name pair "100-0002" of both the recording medium (SD card) 15 and the recording medium (CF card) 16 is reproduced.

In the image plane $4A_1$, in an upper outside portion near the image W1, characters indicating that the scene A is recorded in the folder-name/file-name pair "100-0001" of the SD card in the format of the compressed data (JPEG) and the raw data (RAW) are displayed, and in addition, the characters "JPEG" and "RAW" are enclosed by the information frames X1 and X2. In the image plane 4B, in an upper outside portion near the image W2, characters indicating that the scene B is recorded in the folder-name/file-name pair "100-0001" of the CF card in the format of the compressed data (JPEG) and the raw data (RAW) are displayed, and in addition, the characters "JPEG" and "RAW" are enclosed by the information frames X3 and X4. In the image plane 4C, in an upper outside portion near the image W3, characters indicating that the scene C is recorded in the folder-name/file-name pair "100-0002" of each of the SD card and the CF card in the formats of the compressed data (JPEG) and the raw data (RAW) are displayed, and in addition, the characters "JPEG" and "RAW" beside each of the characters "SD" and "CF" are enclosed by the information frames X5, X6, X7, and X8.

Thus, when a still image is displayed, the unique data is read out from the recording media 15 and/or 16 together with the image data, and the characters (i.e., JPEG, RAW) indicating the image data corresponding to the unique data are enclosed by the information frames X1, X2, . . . , X8.

Figure 5:
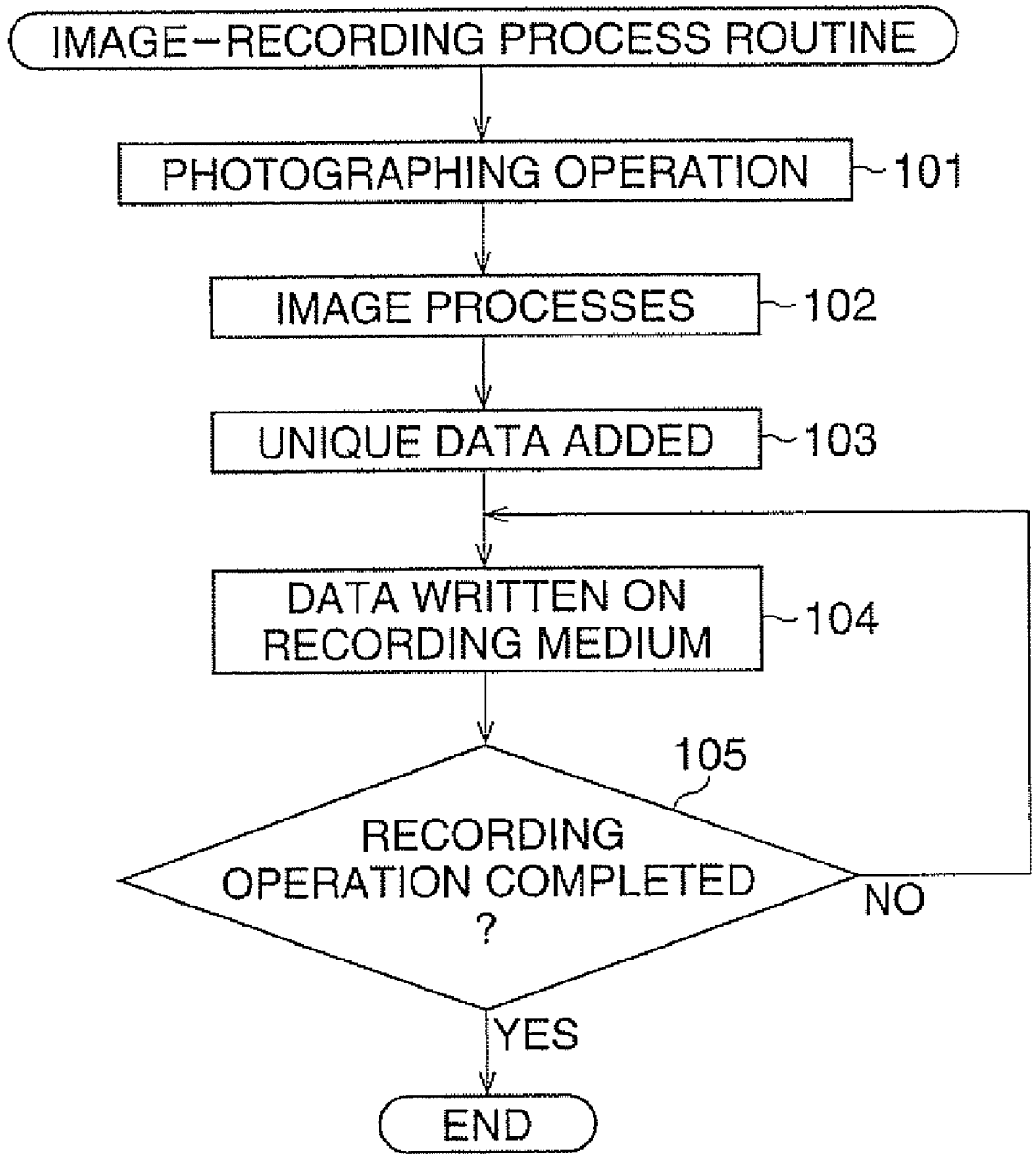
FIG. 5 is a flowchart for an image-recording process routine.

FIG. 5 is a flowchart for the image-recording process routine.

In Step 101, a photographing operation is carried out, so that analog image signals corresponding to the still image are generated in the imaging device 11. In Step 102, the image signals are converted to digital image data, and input to the image processing circuit 12. The image data is stored in the working memory 14 as raw data, and is subjected to image processing such as a white balance process or a compression process according to the JPEG algorithm, to be stored in the working memory 14.

In Step 103, the unique data is added to the raw data and the compressed data stored in the working memory 14, which correspond to the still image. The unique data added to the raw data and the compressed data in a single photographing operation are identical.

In Step 104, the raw data, the compressed data, and the unique data are read out from the working memory 14, and are written on the recording medium 15 or 16. In Step 105, it is determined whether the recording operation has been completed for both of the recording media 15 and 16. If it has been completed, the image-recording process routine ends. If it has not been completed, Step 104 is again executed, so that a recording operation is performed for the recording medium 15 or 16.

Thus, in the image-recording process routine, the common unique data is recorded on the recording media 15 and 16, together with the raw data and the compressed data, in a photographing operation.

FIG. 6 is a flowchart showing the image display process routine. Note that this routine is set in such a manner that a process for the recording medium (SD card) 15 is first executed, and a process for the recording medium (CF card) 16 is then executed.

In Step 201, the preparation of the recording media, or the initialization of the file system for the recording media, is executed, so that image data recorded on the recording media become readable. In Step 202, an image retrieval process is performed, so that an image data corresponding to one of the folder-name/file-name pairs (or frame names), for example, is retrieved. In Step 203, it is determined whether the image data corresponding to the frame name has been detected. When detected, the process proceeds to Step 204, in which the unique data corresponding to the image data (still image or scene) is read out.

It is determined in Step 205 whether the unique data has already been stored in the working memory 14. When Step 205 is executed for the first time, the unique data is not stored in the working memory 14, since the unique data has not been read out. Accordingly, in this case, Step 210 is executed, in which image data is read out from the recording medium. In Step 211, image-decoding/composition processes are carried out for displaying an image in a predetermined area on the screen of the monitor 17. In Step 212, the image is displayed according to the process executed in Step 211, so that an image corresponding to the image data read in Step 210 is displayed on the screen of the monitor 17.

In Step 213, file information for the image data is indicated outside the image on the screen of the monitor 17. The file information contains the type of the recording medium, the format of the image data, the frame name, and so on, and in the example of the image plane 4B, these data are represented as "CF", "JPEG", "RAW", and "100-0001". Further, in the image plane 4B, the characters "JPEG" and "RAW" are enclosed by information frames X3 and X4, since the compressed image data and the raw data are recorded.

After the execution of Step 213, or when it is determined in Step 203 that the image data has not been detected, Step 214 is executed, in which it is determined whether the image retrieval has been completed. The image retrieval is carried out for all the frame names for a single image. When the image retrieval has not been completed, the process returns to Step 202. If the image data is detected, Steps 203, 204, and 205 are executed in this order, and if it is determined in Step 205 that the unique data is stored, Step 206 is executed, in which it is determined whether the unique data that has just been read out in Step 204 coincides with the unique data that is stored in the working memory 14. If they are not coincident, Step 214 is executed, and if they are coincident, Step 213 is executed, in which the file information is indicated outside the image, which is being displayed.

For example, in case of the image plane 4B, when Step 213 is executed for the first time, the information frame X3 is added to the characters "JPEG", and when Step 213 is executed for the second time, the information frame X4 is added to the characters "RAW".

If it is determined in Step 214 that the image retrieval has been completed, Step 215 is executed, in which it is determined whether the image retrieval has been completed for all the recording media. In case two recording media are mounted, when Step 215 is executed for the first time, since the image retrieval has been completed only for one recording medium, the process returns to Step 201. Thus, for the other recording medium, the process routine starting with Step 201 is executed.

For example, in the case of the image plane 4C, since the compressed image data and the raw data are recorded on the two recording media 15 and 16, Step 213 is executed four times. Namely, when Step 213 is executed for the first time, the information frame X5 is added to the characters "JPEG" of the SD card, and when Step 213 is executed for the second time, the information frame X6 is added to the characters "RAW" of the SD card. On the third time, the information frame X7 is added to the characters "JPEG" of the CF card, and on the fourth time, the information frame X8 is added to the characters "RAW" of the CF card.

If it is determined in Step 215 that the image retrieval process has been completed for all the recording media, the image display process routine ends. After that, if a deletion mode is selected by pressing the deletion button 23 (see FIG. 1), for example, the characters "DELETE" and "CANCEL" are indicated in the center portion of the image plane, as shown by reference $4A_2$ (FIG. 4). In this state, by pressing the up button 31 or the down button 32 to select "DELETE", and then pressing the execution button 36, the compressed image data and the raw data of scene A recorded on the recording medium (SD card) are simultaneously deleted. Namely, the deletion operation, which is a common image process, is carried out for the two image data, to which the common unique data has been added. In other words, all of the image data with the same unique data are simultaneously deleted.

As described above, in the embodiment, a common unique data is added to each of the still images obtained in the identical photographing operation, and when reproducing the still image, the unique data is referred to, so that the characters indicating the image data (JPEG, RAW) are enclosed by the information frames X1-X8. Therefore, regarding the single still image displayed on the screen of the monitor 17, if the information frames are displayed with the characters indicating the image data recorded on the recording media 15 and 16, these constitute record information indicating that the unique data recorded on the two recording media are identical. The unique data is specific information for a single photographing operation, and cannot be rewritten like a folder-name/file-name pair, nor coincide with a file name imparted by another camera. Therefore, before performing an image process, the still image can be confirmed, so that an unintended image process is prevented from being carried out.

As a variation of the unique data, it is possible for random numbers to be generated for every photographing operation, and used as the unique data. Further, a serial number (i.e., product number) of the digital camera can be added to the unique data. In this manner, the accuracy of the unique data can be increased, and a common image can be accurately extracted.

Note that the above-described embodiment is a digital camera, in which a common still image is recorded on two recording media detachably mounted on the digital camera. However, the present invention is not restricted to such a digital camera, but can be applied to an image recording device, in which a common still image is recorded on a recording medium, which is detachably mounted on the image recording device, or in an internal memory provided in the image recording device. Further, the present invention can be applied to an image recording device, in which a common still image can be recorded in a plurality of recording areas of an internal memory provided in the image recording device.

Further, in the present invention, image processes performed for images recorded on two recording media are not restricted to a deletion operation, but may include a locking operation (i.e., a mode in which all of the processes are prohibited), or contain all image processes that are usually carried out, including a moving process such as rotation.

Furthermore, the number of recording media, in which identical images are recorded, is not restricted to two, but may be greater than two.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-166532 (filed on Jun. 7, 2005) which is expressly incorporated herein, by reference, in its entirety.

The invention claimed is:

1. An image-recording device comprising:
a recording processor that records a common still image on a plurality of recording media, respectively, which are detachably mounted on said image-recording device;
a unique data recording processor that records, in a single photographing operation, a common unique data in association with said still image individually on each of said plurality of recording media, respectively, said unique data being generated in the single photographing operation; and
a record information displaying processor that, in a displaying operation for said still image, reads out said unique data from each of said plurality of recording media, and when the read-out unique data coincide with one another, controls said image-recording device to display record information indicating that the read-out unique data are identical.

2. An image-recording device according to claim 1, further comprising a monitor for displaying said still image, said record information being displayed near said still image.

3. An image-recording device according to claim 1, wherein said still image can be recorded in a different format on each of said plurality of recording media, said unique data being recorded for every still image recorded in said different format.

4. An image-recording device according to claim 1, further comprising an image processing processor that performs a common image process on still images with which the common unique data are recorded.

5. An image-recording device according to claim 1, wherein said unique data is a total count of shutter operations from the manufacturing date of said image-recording device.

6. An image-recording device comprising:
a recording processor that records a common still image on a recording medium, which is detachably mounted on said image-recording device, and in an internal memory, respectively;
a unique data recording processor that records in a single photographing operation, a common unique data in association with said still image individually on said recording medium and in said internal memory, respectively, said unique data being generated in the single photographing operation; and
a record information displaying processor that, in a displaying operation for said still image, reads out said unique data from said recording medium and from said internal memory, and when the read-out unique data coincide with one another, controls said image-recording device to display record information indicating that the read-out unique data are identical.

7. An image-recording device comprising:
a recording processor that records a common still image in a plurality of recording areas of an internal memory;
a unique data recording processor that records, in a single photographing operation, a common unique data in association with said still image individually in said plurality of recording areas, said unique data being generated in the single photographing operation; and
a record information displaying processor that, in a displaying operation for said still image, reads out said unique data from each of said plurality of recording areas, and when the read-out unique data coincide with one another, controls said image-recording device to display record information indicating that the read-out unique data are identical.

8. An image-recording device according to claim 6, wherein said unique data is a total count of shutter operations from the manufacturing date of said image-recording device.

9. An image-recording device according to claim 7, wherein said unique data is a total count of shutter operations from the manufacturing date of said image-recording device.

10. The image recording device according to claim 6, image data not subjected to image processing and image data subjected to image processing being recorded on said recording media and in said internal memory.

11. The image recording device according to claim 7, image data not subjected to image processing and image data subjected to image processing being recorded in said plurality of recording areas.

12. The image recording device according to claim 1, image data not subjected to image processing and image data subjected to image processing being recorded on recording media of said plurality of recording media.

13. The image recording device according to clam 1, said plurality of recording media being simultaneously usable to record common image data and being separately usable to record different image data on each recording medium.

14. The image recording device according to clam 6, said recording medium and said internal memory being simultaneously usable to record common image data and being separately usable to record different image data on said recording medium and in said internal memory.

15. The image recording device according to claim 7, said plurality of recording areas being simultaneously usable to record common image data and being separately usable to record different image data on each recording area.

16. The image recording device according to claim 1, further comprising an image deletion process, wherein all still images associated with a common unique data can be deleted in a single operation of the image deletion process.

17. The image recording device according to claim 6, further comprising an image deletion process, wherein all still images associated with a common unique data can be deleted in a single operation of the image deletion process.

18. The image recording device according to claim 7, further comprising an image deletion process, wherein all still images associated with a common unique data can be deleted in a single operation of the image deletion process.

19. The image recording device according to claim 1, said unique data comprising a random number.

20. The image recording device according to claim 6, said unique data comprising a random number.

* * * * *